United States Patent
Chen

(10) Patent No.: US 7,133,668 B2
(45) Date of Patent: Nov. 7, 2006

(54) WIRELESS HUMAN INPUT DEVICE AND TRANSMISSION-QUALITY TEST METHOD

(75) Inventor: Chih Chiang Chen, Tainan (TW)

(73) Assignee: Behavior Tech Computer Corp., Sijhih (TW)

( * ) Notice: Subject to any disclaimer, the term of this patent is extended or adjusted under 35 U.S.C. 154(b) by 246 days.

(21) Appl. No.: 10/900,232

(22) Filed: Jul. 28, 2004

(65) Prior Publication Data

US 2005/0037713 A1 Feb. 17, 2005

(30) Foreign Application Priority Data

Aug. 12, 2003 (TW) .............................. 92122081 A

(51) Int. Cl.
*H04Q 7/20* (2006.01)
(52) U.S. Cl. ...................... 455/423; 455/425; 345/168; 345/169; 341/22; 341/26
(58) Field of Classification Search ................ 455/403, 455/423, 424, 425, 67.11, 67.12, 39; 340/825.72, 340/825, 825.71, 825.24; 341/22–26, 173; 345/156, 168, 169, 158, 603, 172; 379/1.01, 379/368; 361/680; 709/220
See application file for complete search history.

(56) References Cited

U.S. PATENT DOCUMENTS

| | | | | |
|---|---|---|---|---|
| 5,977,952 A | * | 11/1999 | Francis | 345/163 |
| 6,167,137 A | * | 12/2000 | Marino et al. | 380/255 |
| 6,567,016 B1 | * | 5/2003 | Rajamani et al. | 341/24 |
| 6,772,236 B1 | * | 8/2004 | Williams et al. | 710/19 |
| 2004/0177132 A1 | * | 9/2004 | Zhang et al. | 341/24 |

* cited by examiner

*Primary Examiner*—Jean Gelin

(57) ABSTRACT

A test method for testing a wireless human input device being totally implemented in program codes which are built in the input device is disclosed. A step (A) is to start a test of transmission quality of the input device. A sub step (a1) is to judge whether received pressing signals obtained by pressing a series of keys of a wireless emitting device are same as some predetermined activating-for-testing pressing signals. A sub step (a2) is to execute a step (B) if the step (a1) is true, otherwise to execute a step (C). A step (B) is to execute a working-mode test of the input device. A sub step (b1) is that the emitting device transmits some sequential test data. A sub step (b2) is that a wireless receiving device of the input device receives the test data from (b1), then the test data are transmitted to an electronic machine connecting to the receiving device. A sub step (b3) is that the electronic machine outputs result data of testing in corresponding to the test data. A step (C) is to execute a normal working-mode of the input device.

20 Claims, 4 Drawing Sheets

*abcdefghijklmnopqrstuvwxyz*

ABCDEFGHIJKLMNOPQRSTUVWXYZ

| ASCII code | KEY | ASCII code | KEY | ASCII code | KEY | ASCII code | KEY |
|---|---|---|---|---|---|---|---|
| 27 | ESC | 32 | SPACE | 33 | ! | 34 | " |
| 35 | # | 36 | $ | 37 | % | 38 | & |
| 39 | ' | 40 | ( | 41 | ) | 42 | * |
| 43 | + | 44 | , | 45 | - | 46 | . |
| 47 | / | 48 | 0 | 49 | 1 | 50 | 2 |
| 51 | 3 | 52 | 4 | 53 | 5 | 54 | 6 |
| 55 | 7 | 56 | 8 | 57 | 9 | 58 | : |
| 59 | ; | 60 | < | 61 | = | 62 | > |
| 63 | ? | 64 | @ | 65 | A | 66 | B |
| 67 | C | 68 | D | 69 | E | 70 | F |
| 71 | G | 72 | H | 73 | I | 74 | J |
| 75 | K | 76 | L | 77 | M | 78 | N |
| 79 | O | 80 | P | 81 | Q | 82 | R |
| 83 | S | 84 | T | 85 | U | 86 | V |
| 87 | W | 88 | X | 89 | Y | 90 | Z |
| 91 | [ | 92 | \ | 93 | ] | 94 | ^ |
| 95 | _ | 96 | ` | 97 | a | 98 | b |
| 99 | c | 100 | d | 101 | e | 102 | f |
| 103 | g | 104 | h | 105 | i | 106 | j |
| 107 | k | 108 | l | 109 | m | 110 | n |
| 111 | o | 112 | p | 113 | q | 114 | r |
| 115 | s | 116 | t | 117 | u | 118 | v |
| 119 | w | 120 | x | 121 | y | 122 | z |
| 123 | { | 124 | \| | 125 | } | 126 | ~ |

WIRELESS HUMAN INPUT DEVICE AND TRANSMISSION-QUALITY TEST METHOD

FIELD OF THE INVENTION

The present invention is related to a test system for testing a wireless human input device, and especially to a transmission-quality test system, it can increase the capability of self-testing of transmission quality of the wireless human input device under the condition that the hardware arrangement of the wireless human input device is maintained to be unchanged.

BACKGROUND OF THE INVENTION

By wide application of wireless human input devices (such as a wireless mouse or a wireless keyboard), and even by wide application of other wireless electronic devices, in a place such as in a family or an office, there is extremely probable a problem of mutual interruption among RF frequencies; when a user finds that a wireless human input device used normally has the situation of having an incorrect action or intermittently in working and non-working, he always can not distinguish whether it is because of mutual interruption among RF frequencies or of the faults of the wireless human input device itself; such a situation becomes more and more serious, thereby providing a test system for solving the above-mentioned problem is necessary, however, the design to increase such a test system in such a conventional wireless human input device normally will derive a problem of increasing the cost of production and a problem of how to make convenience of operation of the test system etc. The problem derived normally will make a manufacturer of such a wireless human input device unwilling to study and develop the same, and users shall still suffer the above deficient situation.

A conventional wireless human input device must be subjected to severe test before packaging and shipping in a factory, and in the last stage of packaging, if it can accept one more test, quality control of the products will get a great favor. However, conventional modes of testing mostly can only be performed with specific test tools, this indistinctly and largely increases the cost of production.

The inventor of the present invention provides a test method performed completely with program codes in view of the above problems to be solved pressingly of the prior arts, the test method can increase the capability of self-testing transmission quality of a wireless human input device under the condition that the hardware arrangement of the wireless human input device is maintained to be unchanged; and it is extremely convenient for performing by a user or a testing operator.

SUMMARY OF THE INVENTION

The object of the present invention is to provide a transmission-quality test system for increasing the capability of self-testing of transmission quality of a wireless human input device under the condition that the hardware arrangement of the wireless human input device is maintained to be unchanged.

Another object of the present invention is to provide a transmission-quality test system for self-testing of transmission quality of a wireless human input device, the test system is extremely convenient for performing by a user or a testing operator.

In order to get the abovementioned objects, the present invention provides a test method for testing transmission quality of a wireless human input device, it can be performed with program codes; the program codes can be built in the wireless human input device. The test method comprises the following steps:

(A) starting a test of the transmission quality of the wireless human input device, in which the step of starting testing includes: (a1) judging whether the received pressing signals obtained by pressing of a series of keys are same as a plurality of predetermined activating-for-testing pressing signals, wherein the received pressing signals are generated by pressing a plurality of keys of the wireless emitting device of the wireless human input device; (a2) executing a step (B) if it is judged as being identical, otherwise to execute a step (C);

(B) executing a working-mode test of the wireless human input device, the step includes: (b1) the wireless emitting device of the wireless human input device transmits a plurality of sequential test data; (b2) a wireless receiving device of the wireless human input device receives the test data from (b1), the test data is transmitted to an electronic machine which is connected to the wireless receiving device; (b3) the electronic machine outputs result data of testing in corresponding to the test data;

(C) executing a normal working-mode of the wireless human input device.

To achieve the above objects, the present invention provides a wireless human input device for self-testing transmission quality, the device includes a wireless emitting device and a wireless receiving device connected to an electronic machine. The wireless human input device is characterized by having a firmware built in itself, the firmware is used to perform the following procedures:

(A) starting a test of the transmission quality of the wireless human input device, in which the step of starting testing includes: (a1) judging whether the received pressing signals obtained by pressing of a series of keys are same as a plurality of predetermined activating-for-testing pressing signals, wherein the received pressing signals are generated by pressing a plurality of keys of the wireless emitting device; (a2) executing a step (B) if it is judged as being identical, otherwise to execute a step (C);

(B) executing a working-mode test of the wireless human input device, the step includes: (b1) the wireless emitting device transmits a plurality of sequential test data; (b2) a wireless receiving device receives the test data, the test data is transmitted to an electronic machine; (b3) the electronic machine outputs result data of testing in corresponding to the test data;

(C) executing a normal working-mode of the wireless human input device.

The present invention will be apparent in its objects, features and functions after reading the detailed description of the preferred embodiments thereof in reference to the accompanying drawings.

BRIEF DESCRIPTION OF THE DRAWINGS

FIG. 4 is a schematic view showing an example of sequential ASCII data in application of the present invention to test the transmission quality of a wireless keyboard.

DETAILED DESCRIPTION OF THE INVENTION

Figure 1:
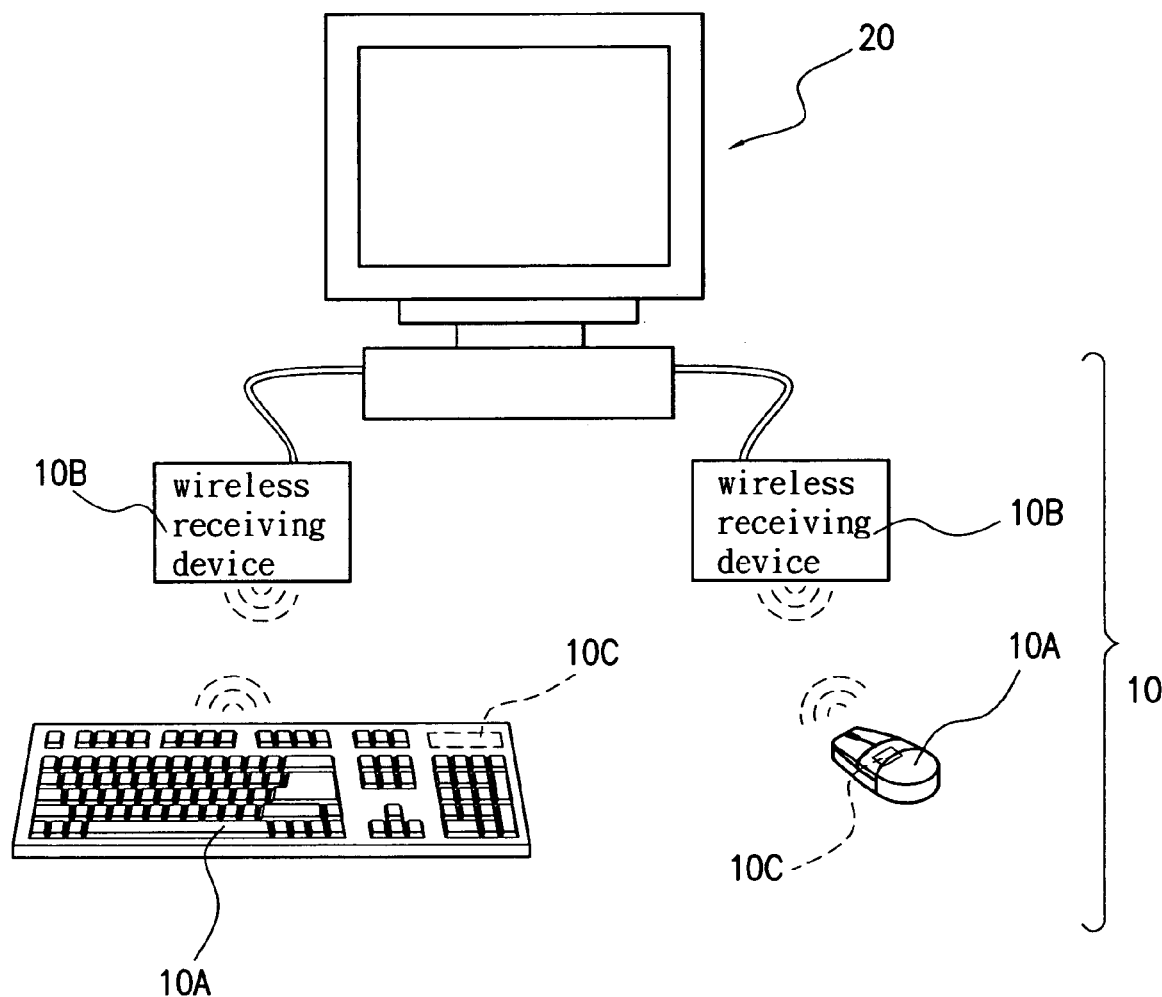
FIG. 1 is a schematic view showing application of the present invention on an electronic machine.

FIG. 1 is a schematic view showing application of the present invention on an electronic machine. The test method 30 of the present invention mainly is to test the transmission quality of a wireless human input device 10, the wireless human-machine input device 10 particularly can be a wireless mouse, a wireless keyboard or some other wireless index input device etc. Generally, the wireless human input device 10 mainly is composed of a wireless emitting device 10A and a wireless receiving device 10B. For a wireless mouse, the wireless emitting device 10A particularly can be a wireless mouse having therein an electronic element for emitting RF signals; while the corresponding wireless receiving device 10B particularly can be a wireless mouse receiver having therein an electronic element for receiving RF electronic signals. Similarly, for a wireless keyboard, the wireless emitting device 10A particularly can be a wireless keyboard having therein an electronic element for emitting RF signals; while the corresponding wireless receiving device 10B particularly can be a wireless keyboard receiver having therein an electronic element for receiving RF electronic signals.

Figure 2:
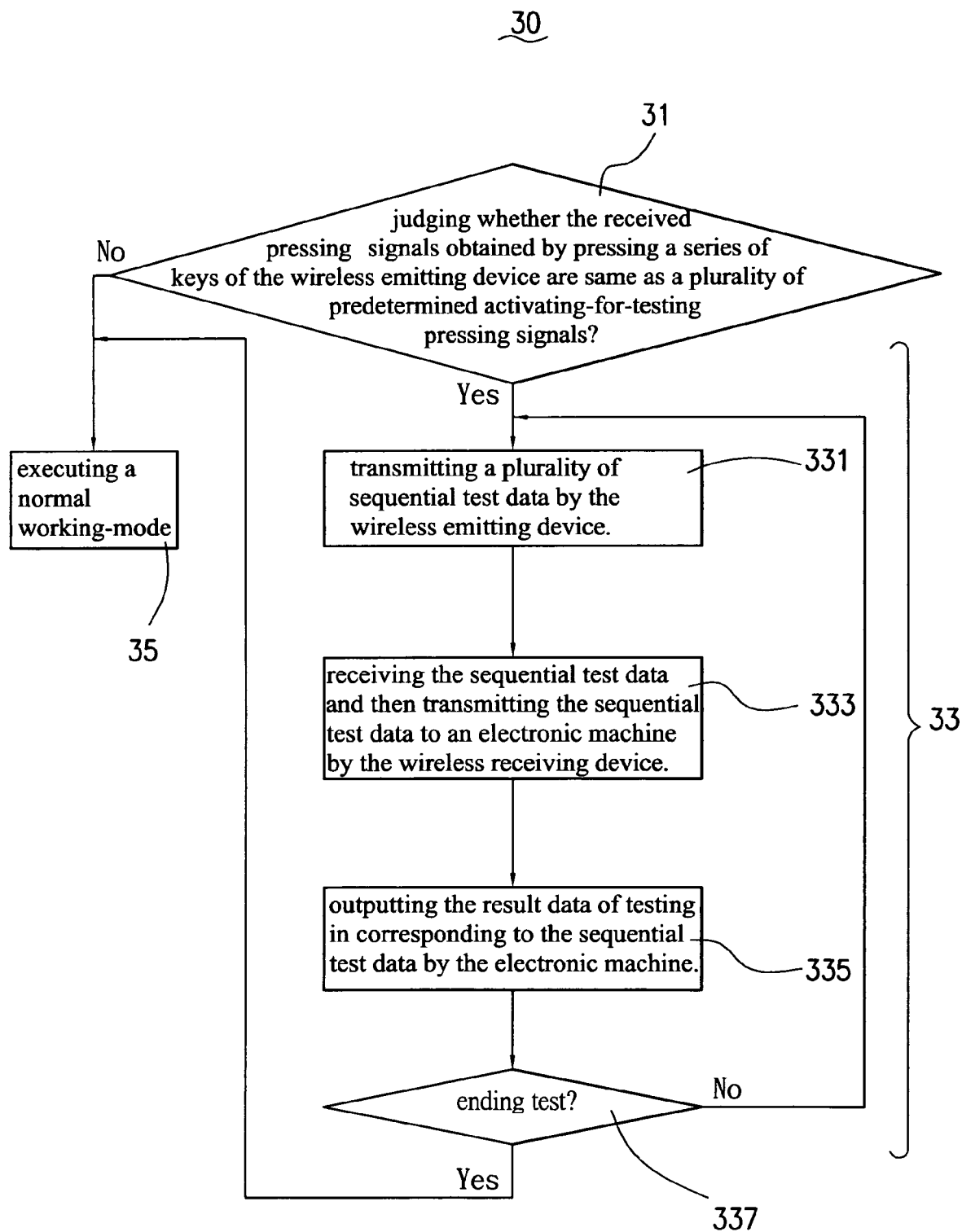
FIG. 2 is a flow chart of the method of the present invention.

FIG. 2 shows a flow chart of the method of the present invention. The test method 30 of the present invention mainly is characterized in the ability of being completely performed by a measure using program codes, it had better use a firmware to particularly perform the test method 30; the firmware 10C is built in the wireless emitting device 10A of the wireless human input device 10. The test method 30 of the present invention mainly comprises the steps as described hereinafter; wherein a step 31 is to start a test of the transmission quality of the wireless human input device 10, firstly the step judges whether the received pressing signals obtained by pressing a series of keys are same as a plurality of predetermined activating-for-testing pressing signals, wherein the pressing signals are generated by pressing a plurality of keys of the wireless emitting device 10A of the wireless human input device 10. In the step 31, the wireless emitting device 10A receives a series of pressing signals generated by pressing a series of keys by a user; taking a wireless mouse as an example, when the series of pressing signals generated by pressing a series of keys by the user are pressing signals generated by simultaneously pressing a left button and a right button and then pressing and releasing a middle button, this way of operation of the middle button is repeated for three times, if the series of pressing signals are completely identical to a plurality of activating-for-testing pressing signals, it means that the user is going to perform a test of transmission quality on the wireless human input device 10 such as the wireless mouse. And taking a wireless keyboard as an example, when the series of pressing signals generated by pressing and releasing different keys by the user are pressing signals generated by pressing tight the key F12, then pressing the key ESC and then releasing the key F12 and the key ESC, this can generate a series of pressing signals, when the series of pressing signals are completely identical to a plurality of activating-for-testing pressing signals, it means that the user is going to perform a test of transmission quality on the wireless human input device 10 such as the wireless keyboard.

Figures 3, 5:
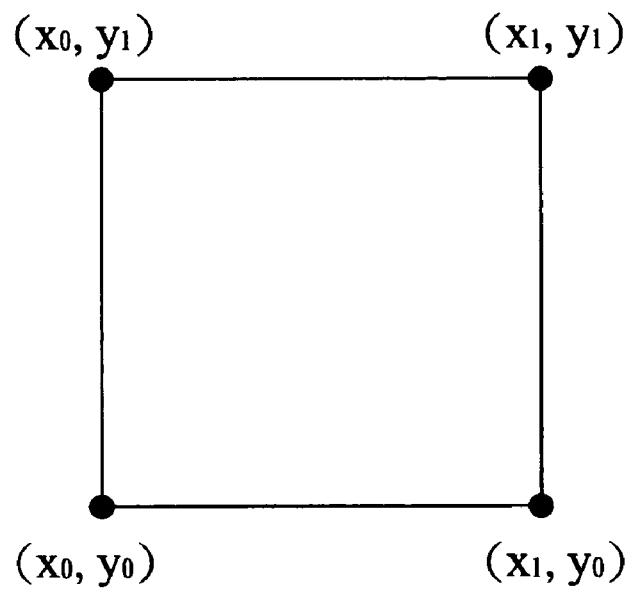
FIG. 3 is a schematic view showing an example of sequential data in application of the present invention to test the transmission quality of a wireless mouse.
FIG. 5 is a schematic view showing an example of sequential data in application of the present invention to test the transmission quality of a wireless keyboard.

A step 33 is to execute a working-mode test of the wireless human input device 10; the step 33 mainly is composed of steps 331 to 337. In the step 331, the wireless emitting device 10A of the wireless human input device 10 transmits a plurality of a plurality of sequential test data. The main object of the step 331 is to allow the wireless emitting device 10A to transmit continuously by having the technical characteristic of the sequential test data; thereby it can be examined to decide whether there is omission or inferiority in transmitting to result subsequent omission or inferiority of receiving. Thereby, the sequential data adopted by the test method 30 of the present invention shall satisfy by nature the meaning of testing transmission quality. For a wireless mouse, the example of the sequential data can be a plurality of data of coordinates that form a geometric shape, for example, the data of coordinates can be used to present a rectangular shape such as the schematic view of FIG. 3 showing an example of sequential data in application of the present invention to test the transmission quality of a wireless mouse. The sequential data start from the coordinates (x0,y0) to (x1,y0), then to (x1,y1), and then to (x0,y1), lastly return to the coordinates (x0,y0) to form a rectangular shape. And for a wireless keyboard, the example of the sequential data can be a plurality of alphanumeric characters that are arranged according to ASCII codes; please refer to FIG. 4 which is a schematic view showing an example of sequential ASCII data in application of the present invention to test the transmission quality of a wireless keyboard. Or the example of the sequential data can be a plurality of data that are arranged according to a sequence in corresponding with a plurality of fonts; please refer to FIG. 5 which is a schematic view showing an example of sequential data in application of the present invention to test the transmission quality of a wireless keyboard.

In the step 333, the wireless receiving device 10B of the wireless human input device 10 receives the sequential test data from the step 331, and transmits the sequential test data to an electronic machine 20. In the step 335, the electronic machine 20 outputs result data of testing in corresponding to the sequential test data. By executing the step 333 and the step 335, the user can very easily know the superiority and inferiority of transmission quality of the wireless human input device 10. In performing the step 333 and the step 335, the electronic machine 20 can receive simultaneously all the coming sequential test data, and have the result data of testing in corresponding to the sequential test data, for example, shown in a display; taking a wireless mouse as an example, the user can examine whether the rectangular shape drawn in the display has discontinuous line sections or is not a correct rectangle; please refer also to FIG. 3, the user can thereby know the superiority and inferiority of transmission quality of the wireless human input device 10 such as a wireless mouse. And taking a wireless keyboard as an example, the sequential test data used to test the wireless keyboard can be an ASCII table as shown in FIG. 4. If the letters A to Z and a to z, and the FIGS. 0 to 9 are particularly used as the sequential test data, the user can examine whether the letter styles displayed in the display omit any letters or figures; referring to FIG. 5, the user can thereby know the superiority and inferiority of transmission quality of the wireless human input device 10 such as a wireless keyboard.

A step 35 is to execute a normal working-mode of the wireless human input device 10. The so-called normal working-mode in the test method 30 of the present invention is the original function of the wireless human input device 10. Taking a wireless mouse as an example, the original function is exactly the function of transmitting and receiving the displacement signals of coordinates and the pressing signals of the keys of the mouse generated during operation on the wireless mouse normally by the user. And taking a wireless keyboard as an example, the original function is exactly the function of transmitting and receiving the pressing signals of keys generated during operation on the wireless keyboard normally by the user.

And more, the test method 30 of the present invention further includes the step 337 as a step to close the test working-mode and then to execute the step 35. Taking a wireless mouse as an example, during the process of performing the steps 331 to 335 of the test working-mode, the user immediately closes the test working-mode by pressing any of the keys of the wireless mouse, and the wireless mouse restores to the step 35 of the normal working-mode. And taking a wireless keyboard as an example, the user immediately stops the test working-mode by pressing any of the keys of the wireless keyboard, and the wireless keyboard restores to the step 35 of the normal working-mode.

The particular embodiment of the abovementioned electronic machine 20 can be a desk computer, a notebook, a tablet P.C., or an electronic machine that can deal with data etc.

It will be apparent to those skilled in this art that various equivalent modifications or changes can be made to the elements of the present invention without departing from the spirit and conception of this invention. Accordingly, all such equivalent modifications and changes shall fall within the scope of the appended claims.

What is claimed is:

1. A transmission-quality test method for testing a wireless human input device, said test method is totally implemented in program codes, said program codes are built in said wireless human input device, said test method comprises the following steps:
   (A) starting a test of transmission quality of said wireless human input device, in which said step of starting testing includes:
      (a1) judging whether received pressing signals obtained by pressing a series of keys are same as a plurality of predetermined activating-for-testing pressing signals, wherein said received pressing signals are generated by pressing a plurality of keys of a wireless emitting device of said wireless human input device;
      (a2) executing a step (B) if said step (a1) is judged to be true, otherwise to execute a step (C);
   (B) executing a working-mode test of said wireless human input device, said step includes:
      (b1) transmitting a plurality of sequential test data by said wireless emitting device of said wireless human input device;
      (b2) receiving said test data of said step (b1) by a wireless receiving device of said wireless human input device, wherein said test data are further transmitted to an electronic machine which is connected to said wireless receiving device;
      (b3) outputting result data of testing in corresponding to said test data by said electronic machine; and
   (C) executing a normal working-mode of said wireless human input device.

2. The test method as in claim 1, wherein said step (B) further includes the following step:
   (b4) stopping said test working-mode and then to execute said step (C).

3. The test method as in claim 1, wherein said wireless human input device is a wireless mouse.

4. The test method as in claim 1, wherein said wireless human input device is a wireless keyboard.

5. The test method as in claim 3, wherein said activating-for-testing pressing signals in said step (A) are pressing signals generated by respectively pressing simultaneously a left button of said wireless mouse and a right button of said wireless mouse, then pressing and releasing a middle button of said wireless mouse at least one time.

6. The test method as in claim 4, wherein said activating-for-testing pressing signals in said step (A) are pressing signals generated by respectively pressing and releasing a plurality of keys of said wireless keyboard at least one time.

7. The test method as in claim 3, wherein said sequential data of said step (b1) are a plurality of data of coordinates that form a geometric shape, said result data of testing in said step (b3) form a geometric figure in corresponding to said data of coordinates, wherein said geometric figure is displayed in a display of said electronic machine.

8. The test method as in claim 4, wherein said sequential data of said step (b1) are a plurality of alphanumeric characters that are arranged according to a sequence, said result data of testing in said step (b3) correspond with a plurality of fonts, said fonts are displayed in a display of said electronic machine.

9. The test method as in claim 4, wherein said sequential data of said step (b1) are a plurality of data that are arranged according to ASCII codes.

10. The test method as in claim 1, wherein said test method further comprises the following steps:
    (D) moving and changing a distance from said wireless emitting device to said wireless emitting device of said wireless human input device, then performing said steps (A) to (C) with said distance after being moved and changed to thereby further test a scope of RF communication capability of said wireless human input device.

11. The test method as in claim 1, wherein said steps (A) to (C) are implemented in a firmware, said firmware is built in said wireless emitting device of said wireless human input device.

12. A wireless human input device for self-testing transmission quality, said input device comprises a wireless emitting device and a wireless receiving device connecting with an electronic machine, said input device is characterized by:
    a firmware built in said wireless emitting device, said firmware is used to perform the following procedures:
       (A) starting a test of transmission quality of said wireless human input device, in which said step of starting testing includes:
          (a1) judging whether received pressing signals obtained by pressing a series of keys are same as a plurality of predetermined activating-for-testing pressing signals, wherein said received pressing signals are generated by pressing a plurality of keys of said wireless emitting device;
          (a2) executing a step (B) if it is judged as being identical, otherwise to execute a step (C);
       (B) executing a working-mode test of said wireless human input device, said step includes:
          (b1) transmitting a plurality of sequential test data by said wireless emitting device;

(b2) receiving said test data by said wireless receiving device, wherein said test data are transmitted to an electronic machine;

(b3) outputting result data of testing in corresponding to said test data by said electronic machine outputs; and (C) executing a normal working-mode of said wireless human input device.

13. A wireless human input device as in claim 12, wherein said firmware is further used to perform the following step:

(b4) stopping said test working-mode and then to execute said step (C).

14. A wireless human input device as in claim 12, wherein said wireless human input device is a wireless mouse.

15. A wireless human input device as in claim 12, wherein said wireless human input device is a wireless keyboard.

16. A wireless human input device as in claim 14, wherein said activating-for-testing pressing signals in said step (A) are pressing signals generated by respectively pressing simultaneously a left button of said mouse and a right key of said mouse, then pressing and releasing a middle button of said mouse at least one time.

17. A wireless human input device as in claim 15, wherein said activating-for-testing pressing signals in said step (A) are pressing signals generated by respectively pressing and releasing a plurality of keys of said wireless keyboard at least one time.

18. A wireless human input device as in claim 14, wherein said sequential data of said step (b1) are a plurality of data of coordinates that form a geometric shape, said result data of testing in said step (b3) form a geometric figure in corresponding to said data of coordinates, wherein said geometric figure is displayed in a display of said electronic machine.

19. A wireless human input device as in claim 15, wherein said sequential data of said step (b1) are a plurality of alphanumeric characters that are arranged according to a sequence, said result data of testing in said step (b3) correspond with a plurality of fonts, said fonts are displayed in a display of said electronic machine.

20. A wireless human input device as in claim 15, wherein said sequential data of said step (b1) are a plurality of data that are arranged according to ASCII codes.

* * * * *